US006726194B2

(12) United States Patent
Migliori

(10) Patent No.: US 6,726,194 B2
(45) Date of Patent: Apr. 27, 2004

(54) ELECTRICALLY-OPERATED CLAMPING DEVICE

(76) Inventor: Luciano Migliori, Piazza Appio Claudio 8, 20124 Milan (IT)

( * ) Notice: Subject to any disclaimer, the term of this patent is extended or adjusted under 35 U.S.C. 154(b) by 0 days.

(21) Appl. No.: 10/287,695

(22) Filed: Nov. 5, 2002

(65) Prior Publication Data

US 2003/0085502 A1 May 8, 2003

(30) Foreign Application Priority Data

Nov. 5, 2001 (IT) .................................... MI2001A2311

(51) Int. Cl.[7] .................................................. B23Q 3/02

(52) U.S. Cl. ....................... 269/225; 269/228; 269/243; 269/237

(58) Field of Search .......................... 269/32, 225, 226, 269/228, 243, 285, 237–239

(56) References Cited

U.S. PATENT DOCUMENTS 4,723,767 A * 2/1988 McPherson et al. .......... 269/32
6,354,580 B1 * 3/2002 Nagai et al. ................ 269/225
6,471,199 B2 * 10/2002 Nagai et al. .................. 269/32
6,585,246 B2 * 7/2003 McCormick et al. ....... 269/239
2001/0013164 A1 8/2001 Morel et al.

FOREIGN PATENT DOCUMENTS

EP 0 243 599 11/1987
EP 0 255 853 2/1988
EP 0 778 107 6/1997
EP 1 201 370 5/2002
WO 99/50944 10/1999

* cited by examiner

*Primary Examiner*—Robert C. Watson
(74) *Attorney, Agent, or Firm*—Young & Thompson

(57) ABSTRACT

An electrically-operated clamping device includes a clamping member pivotally supported by a housing, to rotate between an open and a closed position; the clamping member is connected to electric motor element by a toggle joint mechanism and an axially extendable thrust member. The thrust member comprises a nut screw mechanism, connected to the electric motor element of a geared mechanism having a gear reduction unit and a torque adapter. The electric motor element in turn includes a first and a second electric motor disposed parallel to each other on opposite sides of the thrust member.

7 Claims, 4 Drawing Sheets

ELECTRICALLY-OPERATED CLAMPING DEVICE

BACKGROUND OF THE INVENTION

This invention relates to electric clamps such as toggle joint clamping devices for clamping work pieces, used in particular in the motor vehicle manufacturing or automotive field for holding panels or for clamping workpieces while they are being welded.

STATE OF THE ART

Usually, a toggle joint clamping device, as known and described for example in EP 0 778 107, comprises a clamping member, in the form of a clamping lever pivotally connected to a housing or support head, to rotate between a raised or open position, and a lowered or closed position in which the clamping lever lock or hold a workpiece again a shoulder surface or support frame. The clamping lever usually is connected, by means of an articulated linkage or toggle joint mechanism, to a linearly moving thrust member which at the same time is operatively connected to an actuator such as a pneumatic cylinder; the linear movement of the thrust member is thus transformed into a rotary movement of the clamping member, so that, as it moves from the open to the closed position with respect to a supporting structure, a work-piece can be firmly clamped during welding or similar working operations.

The pneumatically-operated clamping devices of the type previously described, however, present a number of drawbacks. In fact, in order to vary the working stroke of the pneumatic cylinder, it is necessary to substitute the same cylinder, or in any case mechanically modify the system, with consequent repercussions in terms of costs and loss of productivity for plants which make use of a relevant number of such clamping devices, due to a prolonged stoppage of the work cycle.

In addition, the pneumatic devices do not allow a sufficient control of the movement of the clamping lever in cases of emergency, such as to ensure the safety of operators and the same clamping device. Furthermore pneumatically operated clamping devices produce exhaust pressurized air, contamination and loud noise.

In order to obviate these drawbacks, as an alternative to pneumatic cylinders, for certain applications it has been proposed to use electric control means consisting of a single electric motor, as known and described for example in EP 0 255 853, EP 0 243 599, WO 99/50944, U.S. Pat. No. 6,354,580 and U.S. 2001/0013164.

In particular, EP 0 255 853 describes a toggle joint clamping device of the type mentioned above, in which an electric motor is axially aligned and directly connected to a nut screw device comprising a threaded spindle, to generate the linear movement of a thrust member necessary for the operation of the clamping device.

The remaining patents relate to clamping devices in which the nut screw device is connected to an electric motor by a nut screw or a screw shaft in which the same nut screw or the screw shaft is made to rotate by an electric motor through a gear unit for reducing and conforming the number of revolutions of the electric motor, to the required linear movement of the nut screw device.

By adopting an electric motor it is possible to change the pivotal angles of the clamping member, without calling for mechanical or manual interventions usually required for the pneumatically-operated clamping devices, by merely programming the software of an electronic control unit which controls the electric motor.

By electronically controlling the motor it is also possible to create a clamping system which complies with some safety standards in that, in the event of the clamping member encountering an obstacle, the latter may be detected making it possible to electrically generate a safeguard back movement for the opening of the clamping system, so as to prevent accidents, or injury or damage to objects or operators.

In addition, the use of electric motors offers the advantage in terms of economy and management, in that the efficiency of the electrical control is greater than that of the pneumatic control, due to the fewer energy transformations required.

However, the use of conventional electric motors, in particular the use of a conventional electric motor and a single gear unit for connection to the nut screw device, in which the electric motor is electrically and mechanically designed to provide low revolutions and an high driving torque of value sufficient to actuate the clamping device, and to lock a workpiece with a required clamping force, entails dimensional problems for the entire clamping device; in particular as far as the dimensions in width, in order to ensure a reliable operation of the motor and limit its overheating in the event of being used for a large number of operations, the electric motor must be oversized, compared to the required torque for operation of the clamping device. The device is consequently of such dimensions to jeopardize the possibility of having several clamping devices closely and side by side arranged in a limited space.

Moreover, in the event of malfunctioning of the single electric motor, it is necessary to stop the plant in which the clamping device is disposed, with consequent repercussions in terms of productivity and costs.

A further drawback occurs whenever, due to a possible malfunctioning of the electric motor, the clamping member remains locked in the closed position, in that the work-piece cannot be removed, or the clamping member cannot be safely opened whenever an accident occurs during the operative cycle.

To partially solve these problems in a clamping device of the previously mentioned type, EP 1 201 370 suggests the use of two electric motors connected by a simple gear reductor, to a nut screw device having a thrust member to operate the toggle lever mechanism of the clamping device.

Furthermore, to prevent unrequired forward rotation in the open position of the clamping member when power is disconnected to the electric motor, in particular for devices provided with long clamping arms, or in which the clamping arm is provided for moving heavy tools, braking systems or arrangements are required.

Although EP 1 201 370 suggests the use and a particular disposition of two electric motors to keep the housing for the electric motors of the same cross-wise dimensions of the housing for the toggle lever mechanism, nevertheless the use of conventional low-speed motors and a single gear mechanism prevents any possibility to substantially reduce the overall dimensions in respect to a conventional clamping device.

Lastly, a rigid pivotal connection between the toggle lever mechanism and the thrust member of the clamping device, due to the high inertia of the moving members, when the clamping lever suddenly stops against a work-piece, the entire device is subjected to shocks or impact forces which increase the wear on the moving members, reduce the life time and are negatively influencing any control at the stop of the clamping device.

OBJECT OF THE INVENTION

The main object of this invention is to provide an electric clamping device suitably designed to solve the before mentioned drawbacks, by providing an electric clamping device having reduced overall dimensions, and in which the velocity and the inertia of the moving members may be gradually reduced in a controlled mode and in a very short space, at the stop.

A further object of the invention is to provide an electric clamping device of the above mentioned type which allows a greater stability, prevents an undue movement of the clamping arm in its open position, and at the same time provides safe working conditions with a simple and reliable solution.

Another object of the invention is to provide a clamping device provided with electric actuator means, in which the stop of the clamping arm and the clamping force may be positively controlled, to achieve the best safety and working conditions for the same clamping device.

Another object of this invention is to provide an electric clamping device provided with control means capable of exerting a braking action of the clamping member, when approaching the open and closed positions, so as to furtherly limit the effects of mechanical overstressing due to the high inertia of the moving members and/or of the fastened tools.

BRIEF DESCRIPTION OF THE INVENTION

According to the invention an electric clamping device has been provided for clamping workpieces, comprising:

- a housing for a toggle lever mechanism;
- a clamping lever pivotally supported by the housing to rotate between an open and a closed position to lock a workpiece;
- a toggle-lever mechanism inside said housing, said toggle-lever mechanism being operatively connected to said clamping lever and to an axially movable thrust member of a nut screw mechanism; and
- electric motor means operatively connected to the nut screw mechanism, wherein said electric motor means comprises:

- at least one electric motor of the high rotational speed type; and
- a geared mechanism operatively provided between said electric motor and said nut-screw mechanism;
- said geared mechanism comprising a first gear reduction unit connected to the electric motor, and a torque adapter comprising a second gear unit between said first reduction gear unit and said nut screw mechanism.

Preferably, the nut screw mechanism is connected to the toggle-lever mechanism by elastically yielding means.

For the purpose of the present invention, "electric motor of high speed" refers to DC electric motors having a rotational speed equal to or higher than 5000 rpm, preferably comprised between 8000 and 15000 rpm, and a low output torque; said high speed motors have very small dimensions, while allowing a sufficient output power to actuate a workpiece clamping device.

Furthermore, "elastically yielding means" refer to any means suitable to provide a controlled elastic connection between the thrust member of the nut screw mechanism, and the toggle lever mechanism of the clamping device, such as cup shaped springs, helical spring, pad members in synthetic materials having a required modulus, or their combination.

According to a preferred embodiment, the electric motor means comprises first and second DC geared motors, of the type previously referred to, which are parallely arranged on opposite sides of the nut screw mechanism; each geared motor comprises a first gear unit connected to the nut screw mechanism by a respective second gear unit. Both electric motors are connected to an electronic control unit to be synchronously rotated at a same rotational speed, and to be short circuited to brake the same motors and gradually reduce their velocity, to decelerate the movements of the clamping device.

Preferably, the second gear unit comprises a first gear member having a first diameter, connected to the first gear unit, and a second gear member having a diameter equal to or smaller than the first gear member connected to the nut screw mechanism, and an intermediate pinion member between said first and second gear members; practically the second gear unit will act as a speed and toque adapter to conform the geared motors with the constructional features of the nut-screw mechanism and working requirements of the same clamping device; that is by merely changing the gears, it is possible to change the opening and closing velocity of the clamping arm, or the workpiece clamping force.

The nut screw mechanism may be of any desired type; it may be of self-locking type or reversible type which allows for a safety opening of the clamping arm when the electric motors are in a deactivated condition.

BRIEF DESCRIPTION OF THE DRAWINGS

These and further features of a clamping device according to this invention, will be more evident from the following description with reference to the accompany drawings, in which.

DETAILED DESCRIPTION OF THE INVENTION

Figure 1:
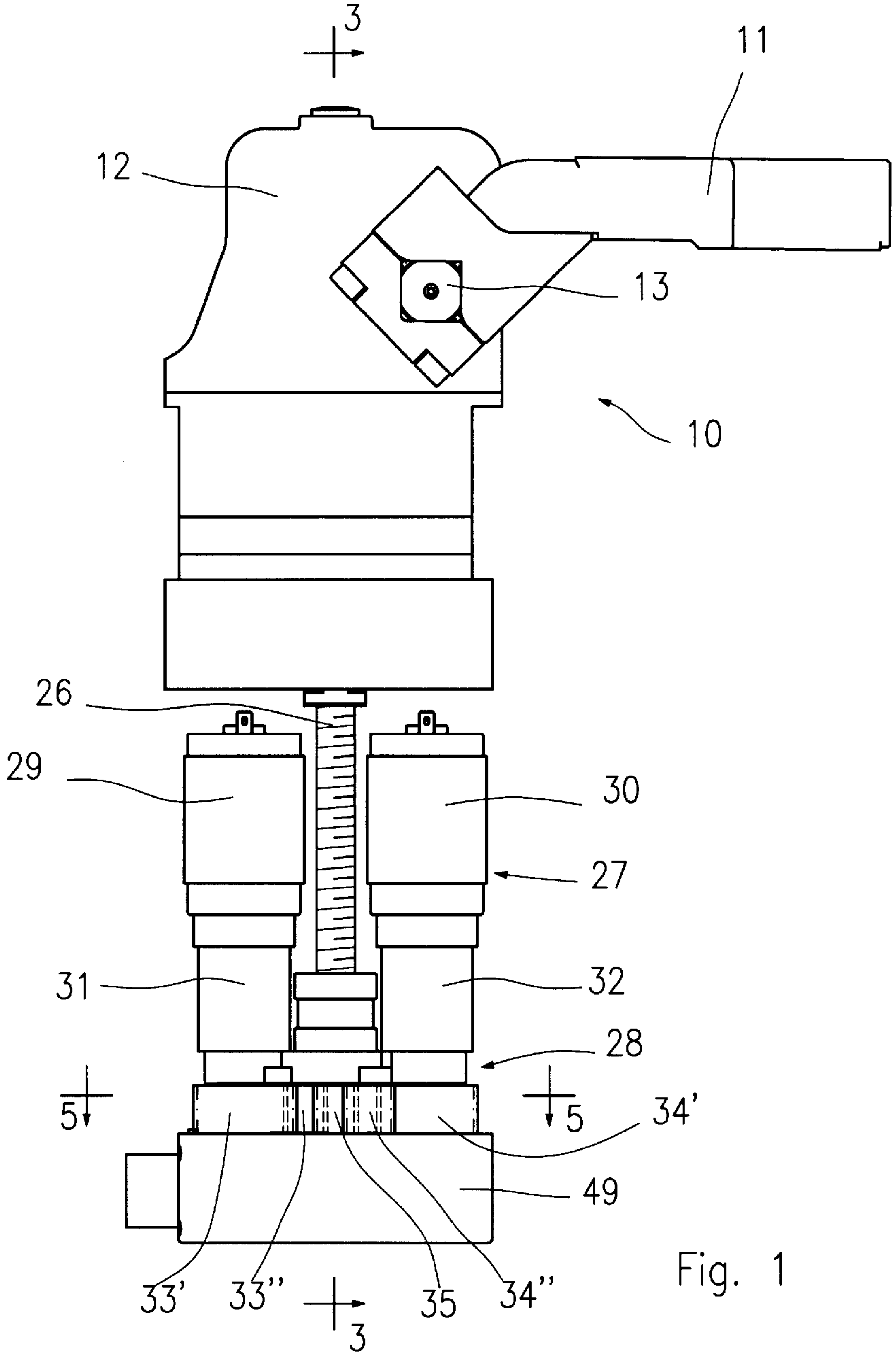
FIG. 1 shows a side view of the clamping device.

The general features of this invention will be more illustrated hereunder by means of an exemplificative embodiment.

According to this embodiment, the clamping device 10 comprises a clamping member consisting of a lever 11, at the end of which a shaped tool or locking member (not shown) can be fastened to securely clamp a workpiece against a shoulder surface or a support frame; the clamping lever 11 is pivotally supported by an housing 12 to rotate between a retracted or open position in which disengages the workpiece, and an advanced or closed position in which clamps the workpiece against the shoulder surface or support frame.

More precisely, the clamping lever 11 is fastened to a pivot shaft 13 rotatably supported by the housing 12, and operatively connected to a toggle lever mechanism 14 inside the housing 12.

The pivot shaft 13 is connected to the crank lever 15 of a toggle lever mechanism 14 comprising a link member 17 hinged at 16 to the crank lever 15 and at 21 to an axially movable and extendable thrust member 18, by means of a connecting member 19.

The connecting member 19 comprises a fork shaped end 20 hingedly connected at 21 to the link member 17, and a sleeve 22 for connection to a nut screw mechanism of the thrust member 18.

More precisely the nut screw mechanism of the thrust member, comprises a tubular element 23 fastened by a pin 24 inside the sleeve 22.

The tubular element 23 is provided with a nut screw 25 which engages with a screw shaft 26 operatively connected to electric motor means 27 by a geared mechanism 28.

Figure 2:
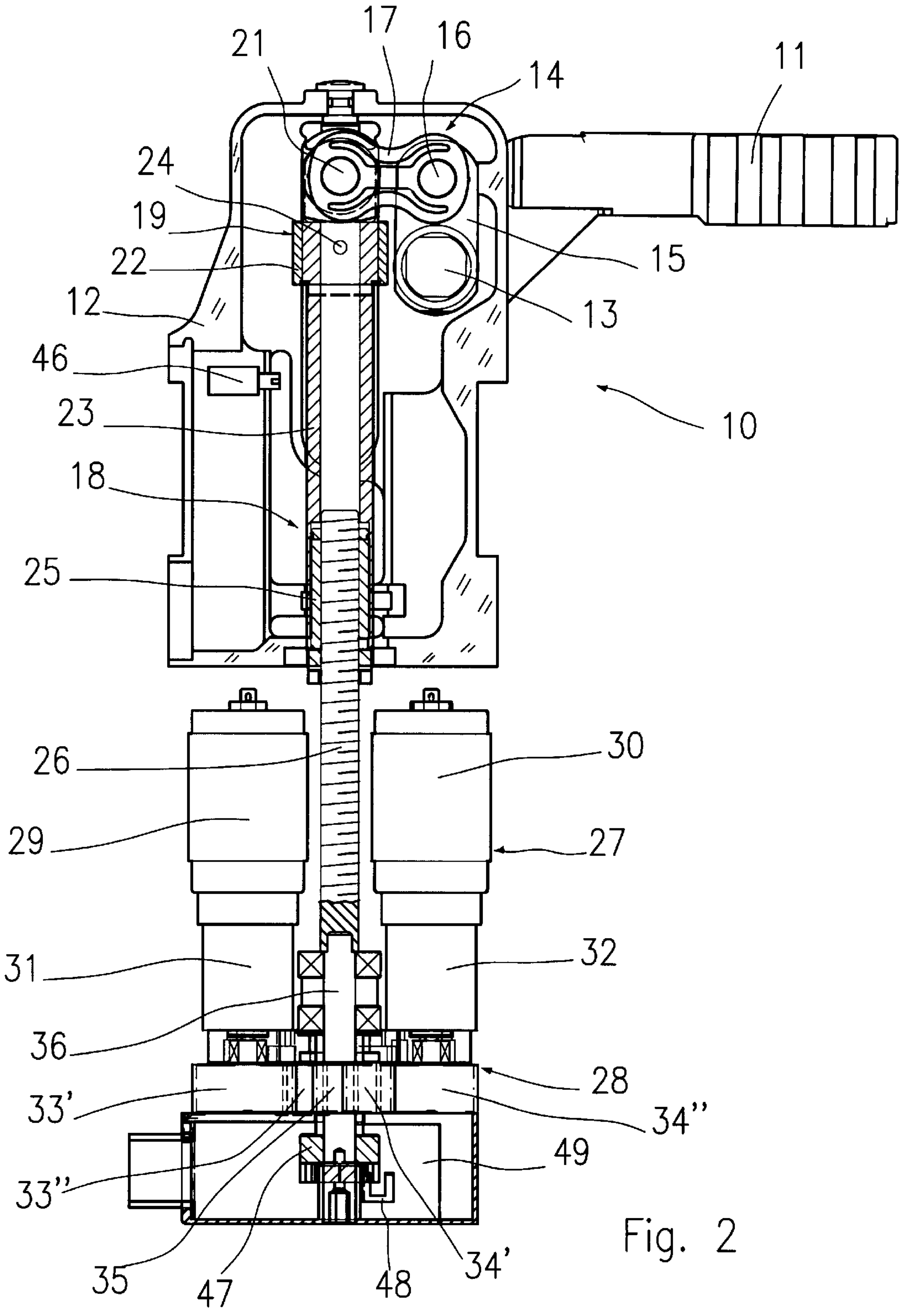
FIG. 2 shows a longitudinal cross-sectional view of the device, along the line 2—2 of FIG. 3.
Figure 3:
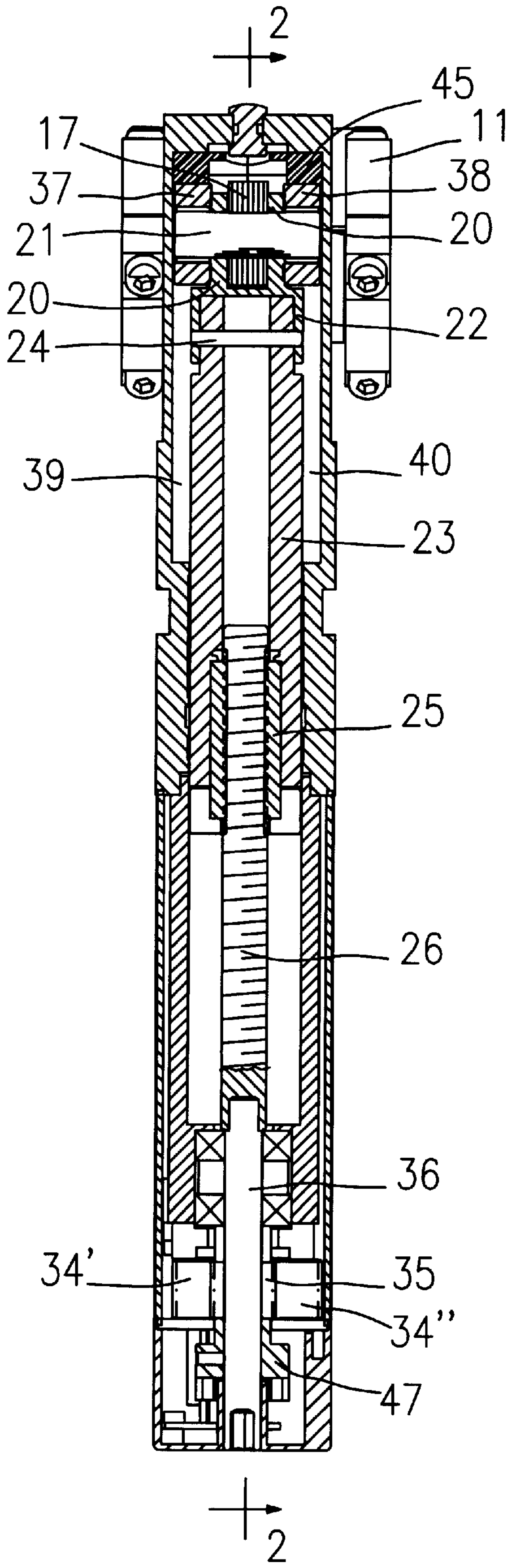
FIG. 3 shows a longitudinal cross-sectional view of the device, along the line 3—3 of FIG. 1.

The electric motor means 27 in the embodiment of FIG. 2 comprise a first DC electric motor 29 and a second DC electric motor 30, both of the reversible type, which are disposed parallel to each other on two opposite sides of the screw shaft 26.

The two electric motors 29, 30 are made to rotate in the same direction and each of them comprises a first gear reduction unit provided by an epicycloid reduction gear 31, 32, which is connected to the nut screw mechanism 25, 26 by a torque adapter provided by a second gear unit 33, 34 disposed between the first gear unit 31, 32 and the nut screw mechanism 25, 26. In particular the gear unit 33 comprises a first gear 33' and a pinion 33" to transmit the output torque from the epicycloid reduction gear 31, to a central gear 35. Said central gear 35 is fastened to a shaft 36, coaxially arranged and connected to the screw shaft 26 of the thrust member 18. Likewise, the gear unit 34 comprises a first gear 34' which by a pinion 34" transmits the output torque from the epicycloid reduction gear 32 to the central gear 35.

The two gears 33' and 34' may be of the same diameter of the central gear 35, or of different diameter for the purpose to adapt the torque and rotational speed of the first gear unit to the nut screw mechanism of the clamping device, and the working requirements for the same clamping device.

The electric motors 29, 30 are of the high rotational speed type to allow a substantial reduction of their overall dimensions; therefore geared motors having high epicycloid reduction gears, with a reduction ratio up to some tenths, may be advantageously used. Preferably the gear ratio between gears 33', 34" and gear 36 is equal to or higher than 1:1 depending on the needs, to better conform the geared mechanism to the rotational speed of the nut screw mechanism and the torque requirements of the clamping device.

As previously stated, the nut screw mechanism may be of any type, preferably of reversible type to allow an emergency movement backwards of the clamping arm 11 when motors 20 and 30 are deactivated.

Figure 5:
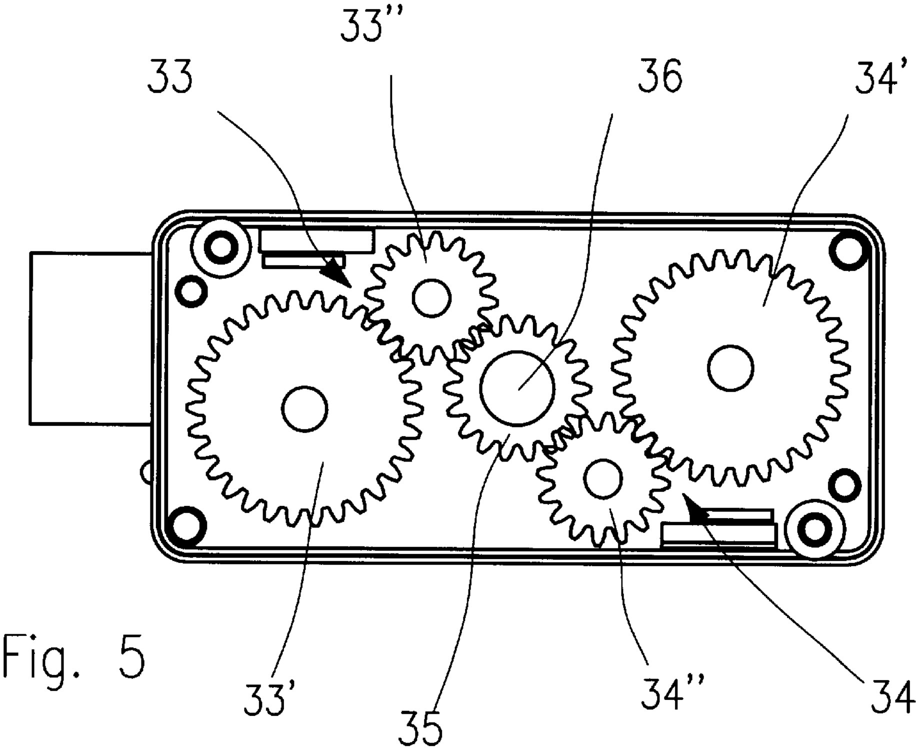
FIG. 5 shows a cross-sectional view of the clamping device, along the line 5—5 of FIG. 1.

Electric motors 29, 30 of reduced dimensions in width and suitably positionable on opposite sides of the screw shaft 26 may be used to be housed in a casing, FIG. 5, having substantially the same cross-sectional dimensions of the housing 12, that is a rectangular cross-section with its major axis extending in a direction parallel to the clamping member 11, thereby enabling several clamping devices 10 to be installed side by side, while occupying a limited space. In particular, the axes of the electric motors 29, 30 are disposed in a plane passing through the longitudinal axis of the clamping device 10, which coincides with the longitudinal axis of the thrust member 18; said plane is forming an angle of about 10° with respect to a plane comprising the longitudinal axis of the thrust member 18 and the major axis of the rectangular cross-section of the housing 12 of the clamping device. This disposition of the motors 29, 30 makes it possible to achieve a satisfactory compromise in exploiting the available space without giving rise to an increase in the overall dimensions of the clamping device 10.

The clamping lever 11 may be angularly rotated between an open position, to insert or remove a workpiece, and a closed position to grip a workpiece against a supporting structure. The open and closed positions of the clamping lever 11 substantially correspond to forward and rearward dead centre positions of the toggle lever mechanism 14.

To enable the operation of the clamping device 10, and in particular to be able to guide the movement of the thrust member 18, the shaft 21 for connection of the toggle lever mechanism to the thrust member 18 is provided, at both ends, with a guide roller 37, 38 movable along a respective longitudinal track 39, 40 inside the housing 12.

When the clamping lever 11 is to be stopped at the open and closed positions, it is necessary to brake the motors to decelerate the movement of the clamping arm 11 and rotation of the geared mechanism, avoiding sudden stop which could damage the entire geared mechanism due to the inertia of the rotating members; therefore it is advisable to gradually decelerate the movement when the clamping arm is approaching the open and closed positions, and to provide damping means suitably designed to take up the thrust of the moving members, by charging an elastically yieldable member provided between the thrust member and the toggle lever mechanism.

To this purpose the electric motors are connected to an electronic control unit, not shown, designed to disconnect the motors from a power source sometime before the clamping arm 11 has reached its stop positions revealed by limit switches or linear and/or rotational sensing means for the thrust member 18, such as optical sensors 46 and 47. Upon disconnection of the motors 29, 30 from the electric power source, the electronic control unit will short circuit the windings of the same motors, causing an electric braking action.

The braking action of the electric motor an deceleration of the moving members must be controlled to avoid the clamping lever 11 beating against the workpiece, or damaging the gear units.

Figure 4:
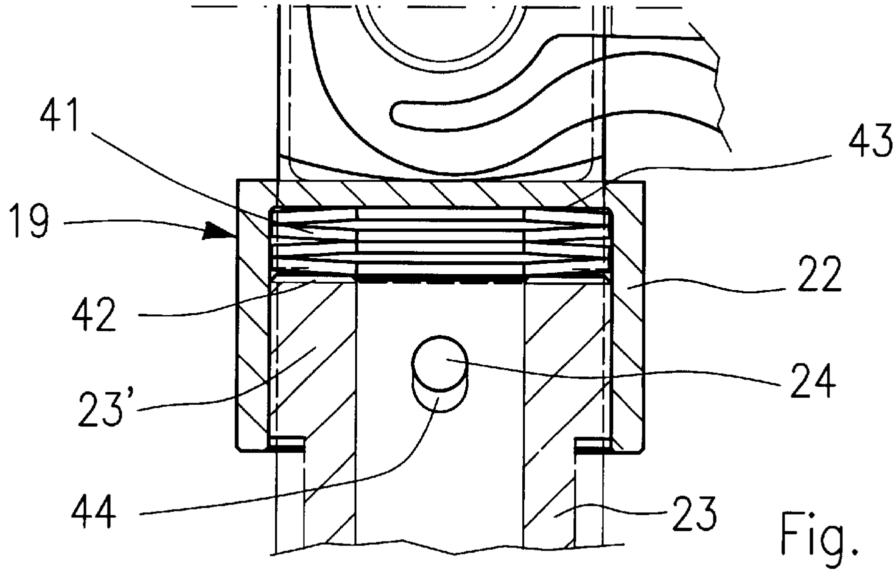
FIG. 4 shows a detail of FIG. 2.

To this purpose, as shown in FIG. 4, dampening means comprising an elastically yielding means 41 are provided in the connection between the thrust member 18 and the toggle lever mechanism. More precisely, the tubular element 23 of the thrust member 18 at its fore end is provided with an enlarge head 23' slidingly fitted into the sleeve 22 of the connecting member 19. A number of cup shaped springs, such as Belleville washers, is provided inside the sleeve 22 between shoulder surfaces 42 of the head 23', and 43 at the bottom of the sleeve 22. The head 23' of the tubular element 23 is connected to the sleeve 22 by the pin 24, while a relative sliding movement is allowed by an elongated hole 44.

Therefore, when the clamping arm 11 is approaching the closed position, the sensor 46 provides a control signal to the electronic control unit, to disconnect the electric motors 29, 37 from the power source, in advance. Due to the continued rotation of the motors and geared mechanism caused by their inertia, the nut screw mechanism 18 will continue to extend axially and to urge the thrust member against the spring 41 inside the sleeve 22, upon the rest of the clamping lever 11 against a workpiece.

The continued movement for a very short space of the thrust member 18 will elastically and gradually compress and charge the springs 41, causing the clamping arm 11 to securely grip the workpiece. Therefore a very strong clamping action is allowed in a controlled mode.

What has been described and shown with reference to the accompanying drawings has been given purely by way of example in order to illustrate the general features of the invention, and a preferred embodiment thereof, it being understood that other modifications to the clamping device are possible, without thereby departing from the scope of the claims.

What I claim is:

1. A clamping device of the type comprising:

a housing for a toggle lever mechanism;

a clamping lever pivotally supported by the housing to rotate between an open and a closed position to lock a workpiece;

a toggle-lever mechanism inside said housing, said toggle-lever mechanism being operatively connected to said clamping lever and to an axially extendable thrust member of a nut screw mechanism; and a motor operatively connected to said nut screw mechanism, wherein said motor comprises:

at least one electric motor with a rotational speed of at least 5000 rpm; and a geared mechanism operatively provided between said at least one electric motor and said nut-screw mechanism, said geared mechanism comprising a first gear reduction unit connected to said at least one electric motor, and a torque adapter comprising a second gear unit between said first reduction gear unit and said nut screw mechanism.

2. A clamping device of the type comprising:

a housing for a toggle lever mechanism;

a clamping lever pivotally supported by the housing to rotate between an open and a closed position to lock a workpiece;

a toggle-lever mechanism inside said housing, said toggle-lever mechanism being operatively connected to said clamping lever and to an axially extendable thrust member of a nut screw mechanism;

an elastically yielding means between said thrust member and said toggle-lever mechanism; and a motor operatively connected to said nut screw mechanism, wherein said motor comprises:

at least one electric motor with a rotational speed of at least 5000 rpm; and a geared mechanism operatively provided between said at least one electric motor and said nut-screw mechanism, said geared mechanism comprising a first gear reduction unit connected to said at least one electric motor, and a torque adapter comprising a second gear unit between said first reduction gear unit and said nut screw mechanism.

3. The clamping device according to claim 1, wherein said thrust member comprises a screw shaft rotatably supported and operatively connected to said geared mechanism, and a tubular element provided with a nut screw, said tubular element being slidably connected to a connection member of said toggle lever mechanism; and elastically yielding cup-shaped springs between shoulder surfaces of said tubular element and said connection member of said toggle lever mechanism.

4. A clamping device of the type comprising:

a housing for a toggle lever mechanism;

a clamping lever pivotally supported by the housing to rotate between an open and a closed position to lock a workpiece;

a toggle-lever mechanism inside said housing, said toggle-lever mechanism being operatively connected to said clamping lever and to an axially extendable thrust member of a nut screw mechanism; and a motor operatively connected to said nut screw mechanism, wherein said motor comprises:

first and second electric motors parallely arranged to each other, on opposite sides of said thrust member of said nut-screw mechanism; and a geared mechanism operatively provided between each of said first and second electric motors and said nut-screw mechanism, said geared mechanism comprising a first gear reduction unit connected to said first electric motor, and a torque adapter comprising a second gear unit between said first reduction gear unit and said nut screw mechanism.

5. The clamping device according to claim 1, wherein said second gear unit comprises a first gear member having a first diameter, connected to said first gear reduction unit, and a second gear member having a second diameter, connected to said nut screw mechanism.

6. The clamping device according to claim 5, wherein the diameter of said first gear member is equal to or greater than the diameter of said second gear member.

7. The clamping device according to claim 1, in which said at least one electric motor is connectable to a power source by an electronic control unit, said electronic control unit for short circuiting said electric motors; the clamping device further comprising sensing means for providing said control unit with control signals to short circuit said at least one electric motor, to brake the same when said clamping lever is approaching the open and closed positions of said clamping lever.

* * * * *

UNITED STATES PATENT AND TRADEMARK OFFICE

CERTIFICATE OF CORRECTION

PATENT NO. : 6,726,194 B2
DATED : April 27, 2004
INVENTOR(S) : Migliori

It is certified that error appears in the above-identified patent and that said Letters Patent is hereby corrected as shown below:

Column 1,
Line 19, change "lock" to -- locks --;
Line 19, change "hold" to -- holds --;
Line 19, change "again" to -- against --.

Signed and Sealed this

Thirteenth Day of July, 2004

JON W. DUDAS
*Acting Director of the United States Patent and Trademark Office*